INVENTOR.
WILLIAM J. MAYER.

Aug. 17, 1937.   W. J. MAYER   2,090,542
SYSTEM OF ILLUMINATION
Filed July 5, 1934   2 Sheets-Sheet 2

INVENTOR.
WILLIAM J. MAYER.
BY
John P. Tanbox
ATTORNEY.

Patented Aug. 17, 1937

2,090,542

UNITED STATES PATENT OFFICE 2,090,542

SYSTEM OF ILLUMINATION

William J. Mayer, Glenside, Pa., assignor to Edward G. Budd Manufacturing Company, Philadelphia, Pa., a corporation of Pennsylvania Application July 5, 1934, Serial No. 733,808

3 Claims. (Cl. 240—7.35)

This invention relates to vehicles and more particularly to the interior illumination thereof, and has for its principal objects the attainment of a soft uniformly diffused illumination throughout the interior of the vehicle body, to provide substantially unbroken interior surfaces housing behind them the wiring conduits and lamp sockets, and to attain illumination at substantially all points of the car substantially free of detrimental effects from localized obstructional elements.

Among other objects of my invention are the concealment of lighting fixtures and bright light sources; the provision of a major lighting by indirect means and a minimum of quasi-direct lighting; the avoidance of localized bright spots upon the central ceiling structure; and the attainment of a diffused lighting such that persons standing in the aisles of the vehicle will not interfere with the illumination upon books or other articles being observed by passengers located in the seats. Other features are the reduction in the reflecting mediums to a small number of parts and their construction in a manner such that they are subject to ready replacement or repair and the provision of greater percentage of illumination in the seating zone and a smaller while yet sufficient illumination in the aisle.

Figure 1:
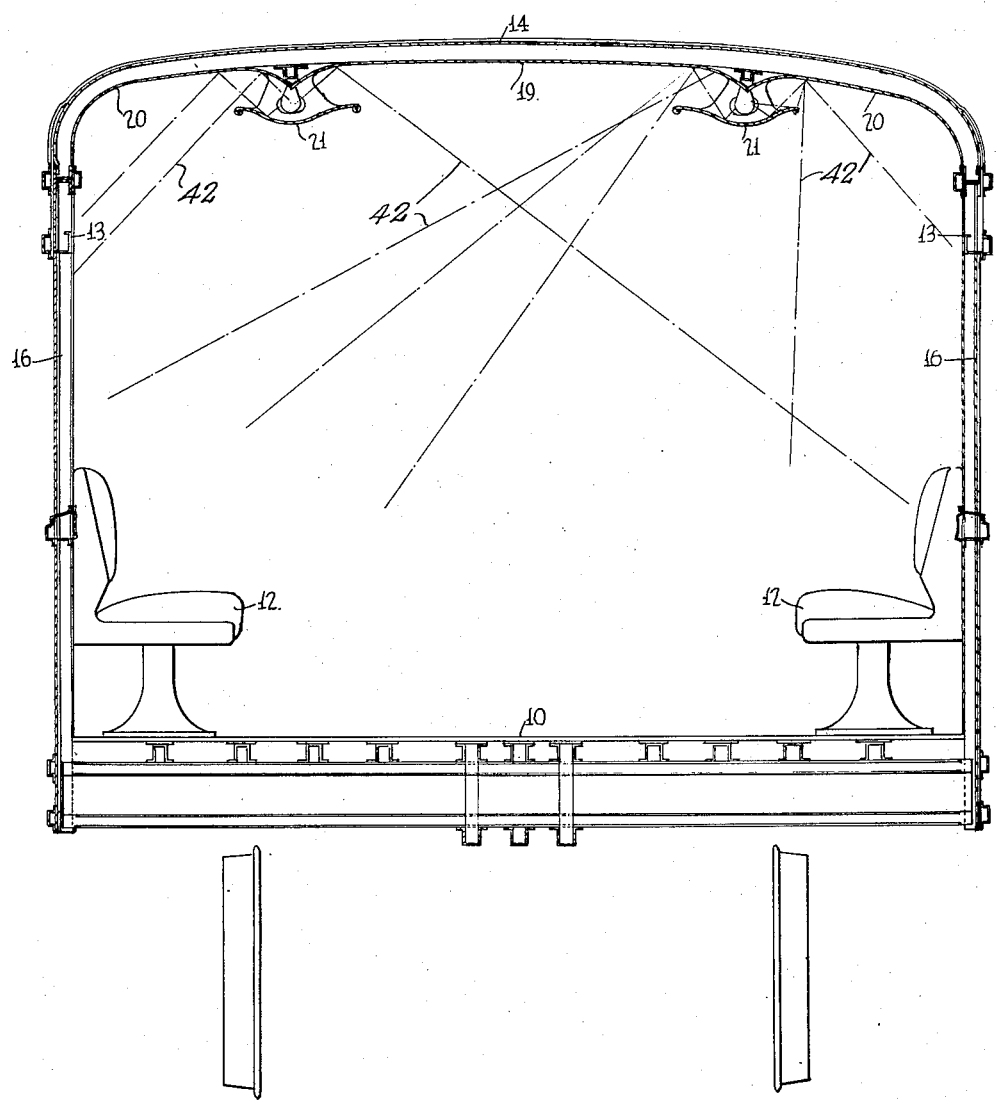

My invention will be better understood from the following description when considered in connection with the accompanying drawings, wherein Fig. 1 is a transverse cross section of a vehicle incorporating the features of my invention.

Figure 2:
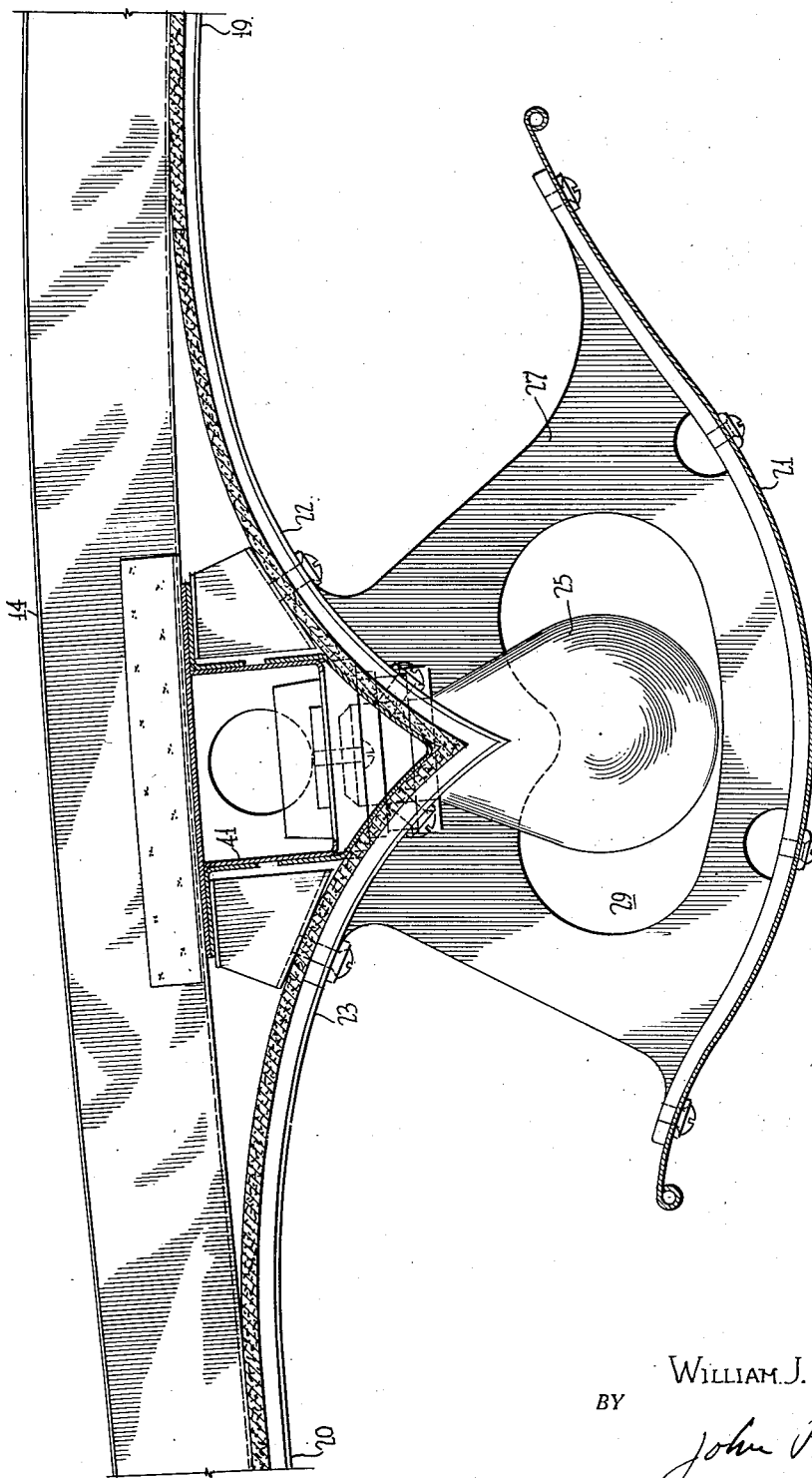

Fig. 2 is a detail section showing the arrangement of the reflecting surfaces and light sources.

Considering the illustrated embodiment of my invention there is shown a transverse section of the interior of a vehicle, in this instance being a high speed rail vehicle of light weight, having a transversely extending floor member 10, the central area of which comprises the aisle to either side of which are located the rows of seats 12, the enclosure being completed by the side walls 13 and roof structure 14. The side walls are of light weight hollow construction having an uninterrupted portion broken at longitudinally spaced locations by window openings 16 and the entire structure having closed and open channel section members.

The roof structure 14 of the vehicle comprises box section channel members completely defining the limiting elements of the vehicle structure. These members are spaced longitudinally and united by longitudinally extending box section members. The false or interior roof of the car comprising a central portion 19 and spaced arcuate side portions 20 and between these two portions the lighting ducts 21. The side portions 20 are positioned in their defining shape by suitable connections at various points with respect to the side wall structural elements and with respect to a channel member secured to the purlines. The arcuate interior roof portion 20 comprises a major diffusing surface for the indirect lighting arrangements and the lighting duct 21 comprising elemental parts provides the interiorly concealed housing for the light sources as well as the primary reflecting surfaces. This duct is preferably made up of elemental sheet metal parts. Light sources 25 are positioned interiorly of this duct and spaced longitudinally thereof with respect to the seats and the candle power of the particular light sources is made appropriate to provide the necessary flux per unit area illumination in the seats. The duct has dual substantially circular reflecting portions 22 and 23 and the remaining portions 21 being substantially parabolic. The lower reflecting side wall of the duct 21 is secured to the portions 22 and 23 at spaced intervals by reinforcing elements 27 in the nature of straps. These straps are preferably in the nature of divisional walls providing compartments if this is desired, and they have been found useful, giving a further diffused illumination by the throwing of side lighting effects from the light sources into the reflecting duct and down into the car at an angle.

The arrangement of the reflecting surfaces may be such that the central false roof structure 19 over the aisle is of diffused illumination providing a restful objective for the eyes without distrubing the effective interior illumination of the car. To illuminate the central ceiling structure a composite arrangement of reflecting surfaces and a slight adjustment of direction of the open area of the reflecting surfaces may be utilized and thus obtain an arrangement wherein the ceiling above the aisle is illuminated as well as that above the seats and additional lateral as well as vertical flux distribution is attained.

The duct construction may be preferably of sheet metal, the portion 21 comprising an integral unitary ogee curve of proper contour. The reflecting portions 22 and 23 of the illuminating system may preferably be sheet metal members, although not necessarily so, and merge into the roof sections 19 and 20 by gradual curves, the major reflecting portions of these parts comprising parts of circles having a common intersection above the light source. The reflecting surface 21 below the light source is parabolic in contour, the combination of the two providing vertical light flux in the areas of the seats as well as substantially vertical light flux in the central portions of the vehicle. The ceiling illumination of the car is diffused and uniform, avoiding bright light spots, while the walled sources are totally concealed from the normal vision of the passenger. Central vertical and lateral illumination is available at various levels and parts of the vehicle providing comfortable reading facilities throughout. To further provide ventilation and radiation of heat generated by the light sources, the members 27 may centrally be perforated or pierced to provide openings 28. These openings in addition to creating better ventilation of the light sources, provide further emission of light with regard to the reflecting surfaces so as to further diffuse the car illumination. Economically the conduits 41 of the illuminating system serve multiple uses. They provide structural members for the car body, closed conduits for the electric cables and supports for the reflecting surfaces 22, 23 and 21, the surfaces 22 and 23 concealing this duct in its final form.

Further advantageous features of the reflecting elements is the provision interiorly thereof without additional structure of a conduit portion in which are carried the electrical cables, wiring and fixture securement parts. Inasmuch as the light sources and their lamp holders are entirely out of normal visual range of the passengers, these sockets may be of the more common and economical type not requiring ornate ornamentation. The range of effective illumination is indicated transversely of the car by the schematic light wave traces 42 as to the aisle, as to the seats under the reflectors, and as to the opposite seats. Further, the arrangement of reflecting surfaces with relation to the interior reflecting surface of the ceiling of the car materially adds to the effectiveness of the illuminating system.

Although by way of example I have illustrated a single embodiment of my invention it will be readily apparent that modifications within the true spirit and scope thereof are intended to be covered by the hereto appended claims.

What I claim is:

1. An illumination system comprising longitudinally extending light ducts and light sources substantially centrally thereof, said ducts comprising reflecting surfaces, the lower surface of which is substantially parabolic in contour, the upper surface of which is spaced from the lower reflecting surface and at the opposite side of the light sources and is substantially of the arc of a circle in section contour, and said upper surface comprising two such contoured reflectors oppositely directed, together with conduits for the wiring of the light sources and sockets for the light sources occupying the space between said two reflectors having the cross section of the arc of a circle.

2. In an interior illuminating system, an elongated reflector extending along the ceiling or wall of the compartment to be illuminated and shaped to provide a pair of oppositely directed reflecting surfaces of substantially arcuate contour in cross section, a coacting reflector of substantially parabolic contour in cross section disposed in spaced substantially parallel relation with said first-named reflector and together with the latter forming an elongated lighting duct which is open at opposite sides thereof, a conduit for wiring and light sockets disposed in rear of said first-named reflector, and a plurality of light bulbs mounted in said conduit and projecting into said duct.

3. An illuminating system particularly adapted for the seating compartments of railway cars and the like, comprising an elongated strip of material extending along the ceiling or wall of the compartment to be illuminated and so shaped as to provide opposed arcuate reflectors adapted to direct light rays at divergent angles into the compartment, and a coacting reflector also formed from an elongated strip of material having a reflecting surface which is substantially parabolic in cross sectional contour, means for supporting said latter reflector in spaced relation below or outwardly from its coacting reflector so that the reflectors together provide an elongated lighting duct open at its opposite sides, a conduit mounted in rear of said opposed arcuate reflectors and a plurality of light bulbs mounted in said conduit and projecting into said duct.

WILLIAM J. MAYER.